March 5, 1963 J. C. HUBBS 3,079,792
ELECTRONIC FORCE BALANCING DEVICE
Filed July 24, 1959 4 Sheets-Sheet 1
FIG_1
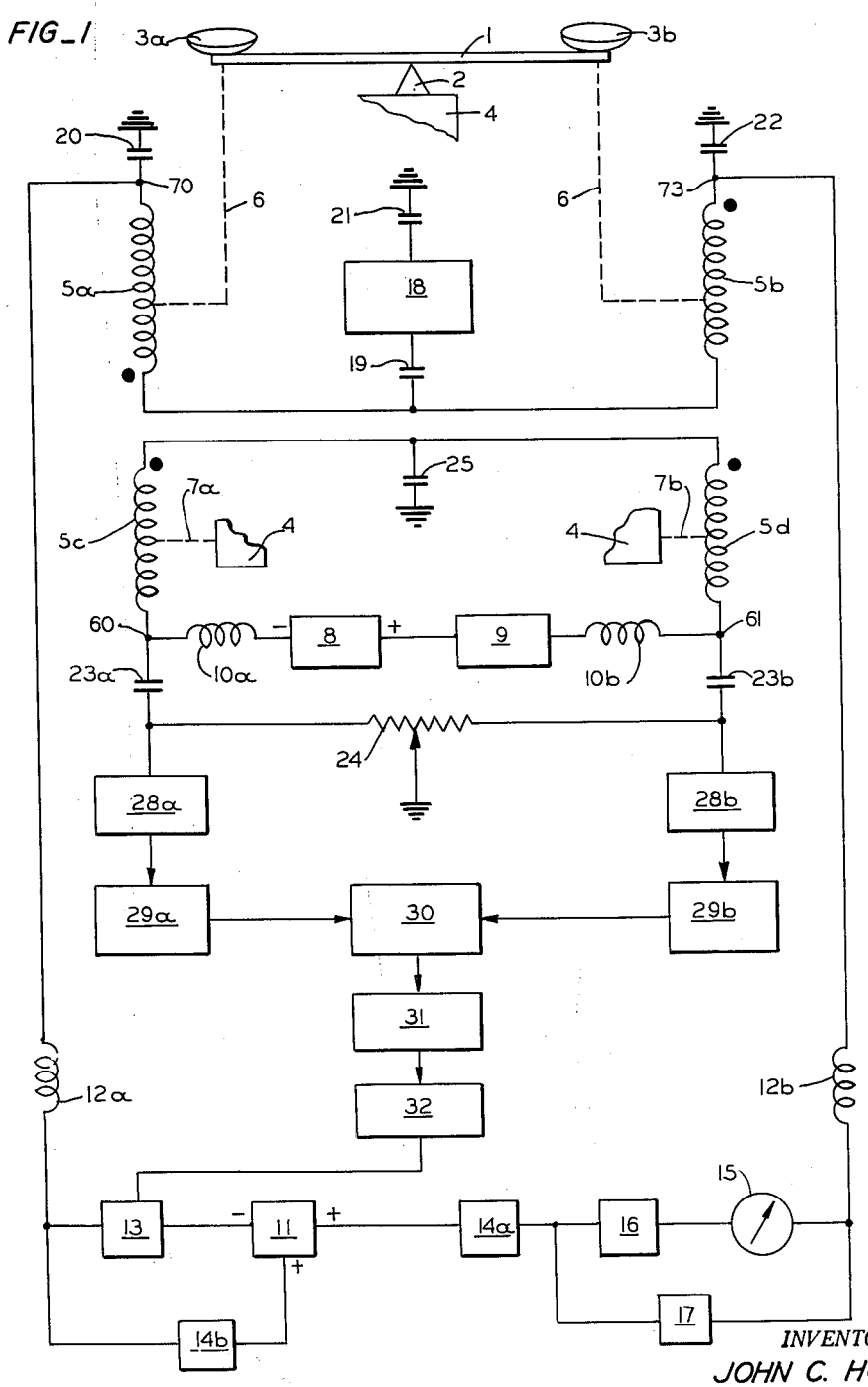
INVENTOR.
JOHN C. HUBBS
BY
ATTORNEY

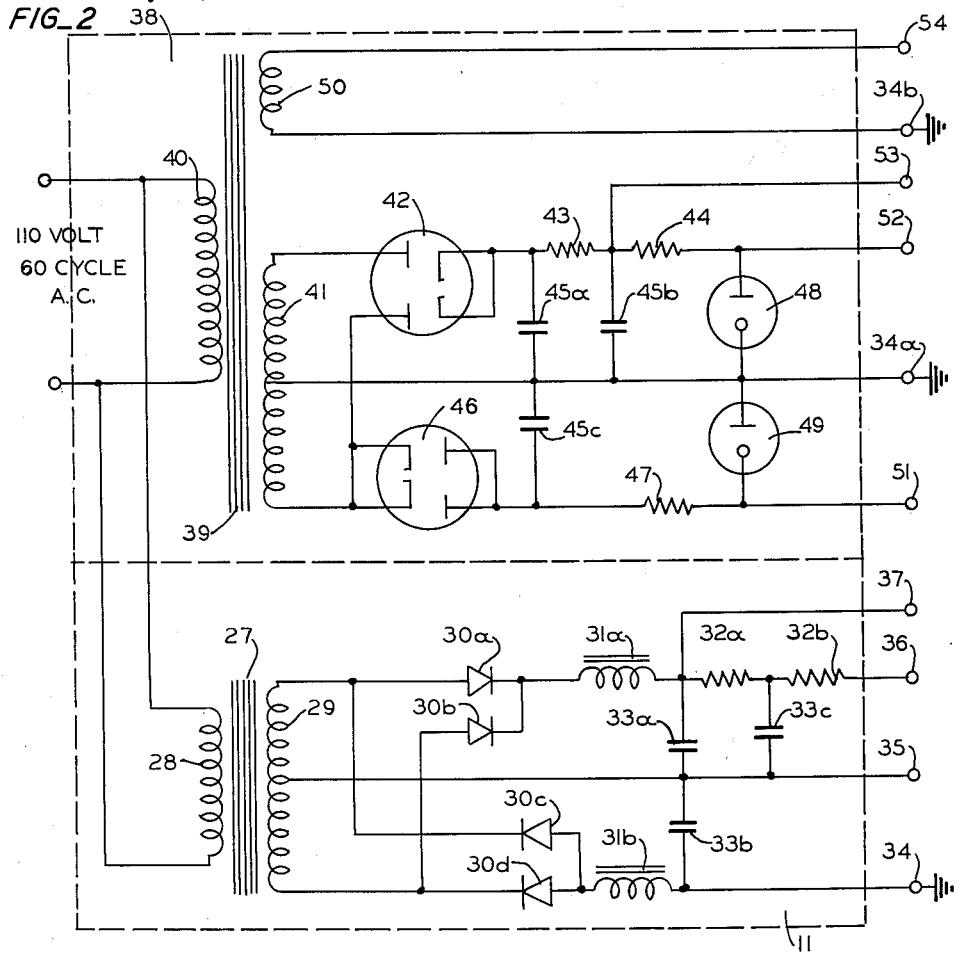
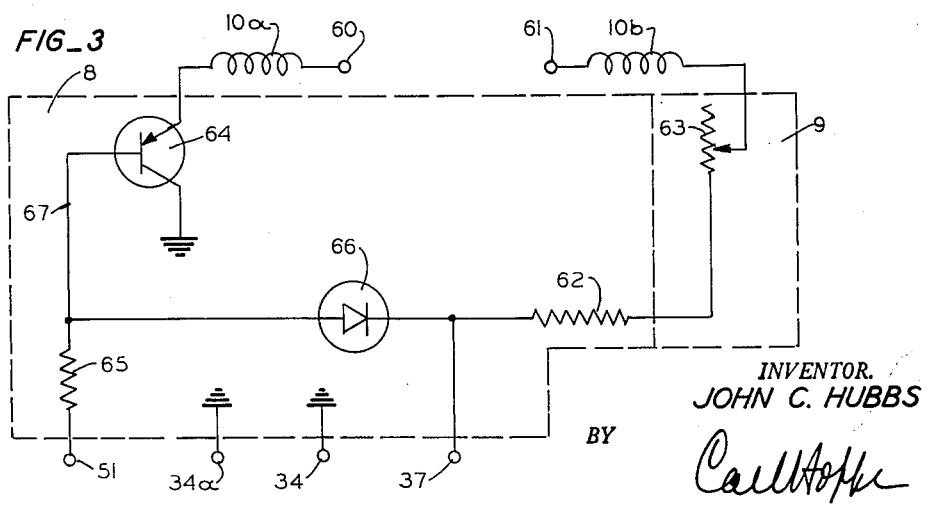

March 5, 1963    J. C. HUBBS    3,079,792
ELECTRONIC FORCE BALANCING DEVICE
Filed July 24, 1959    4 Sheets-Sheet 3
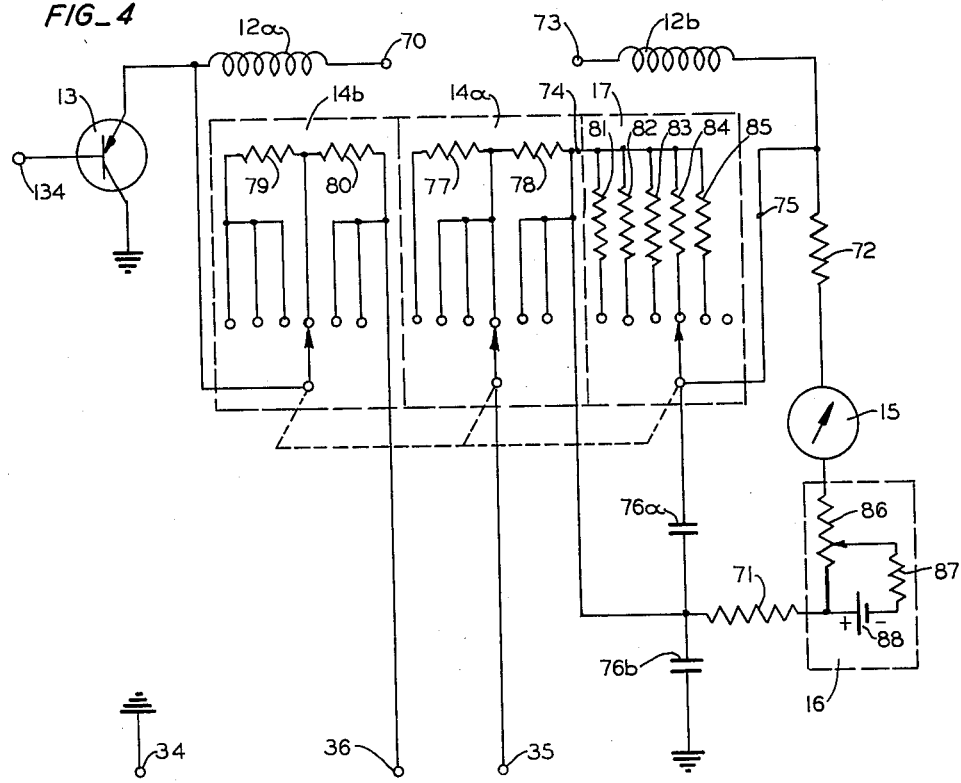
FIG_4
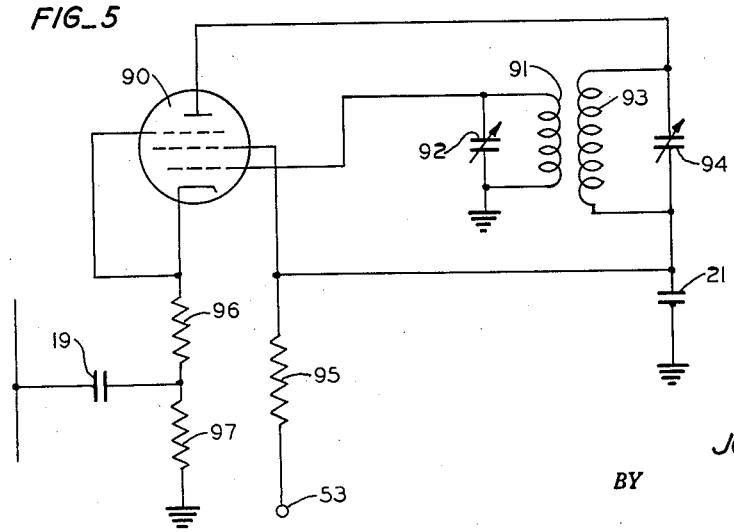
FIG_5
INVENTOR.
JOHN C. HUBBS
BY
ATTORNEY

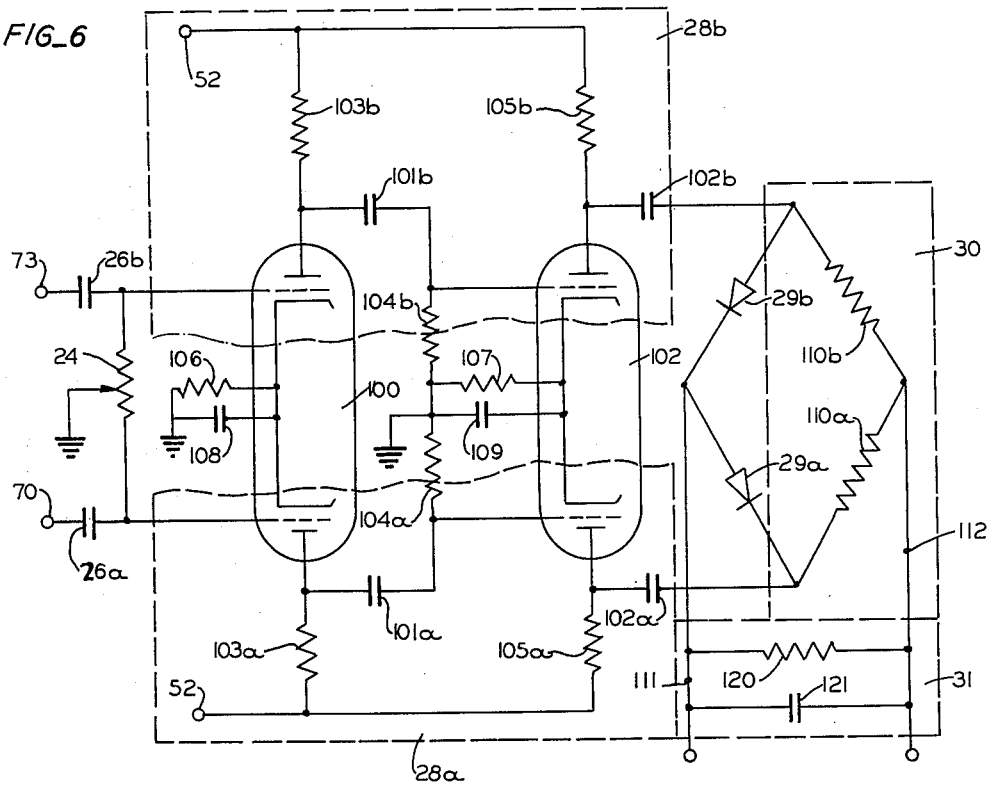
FIG_6
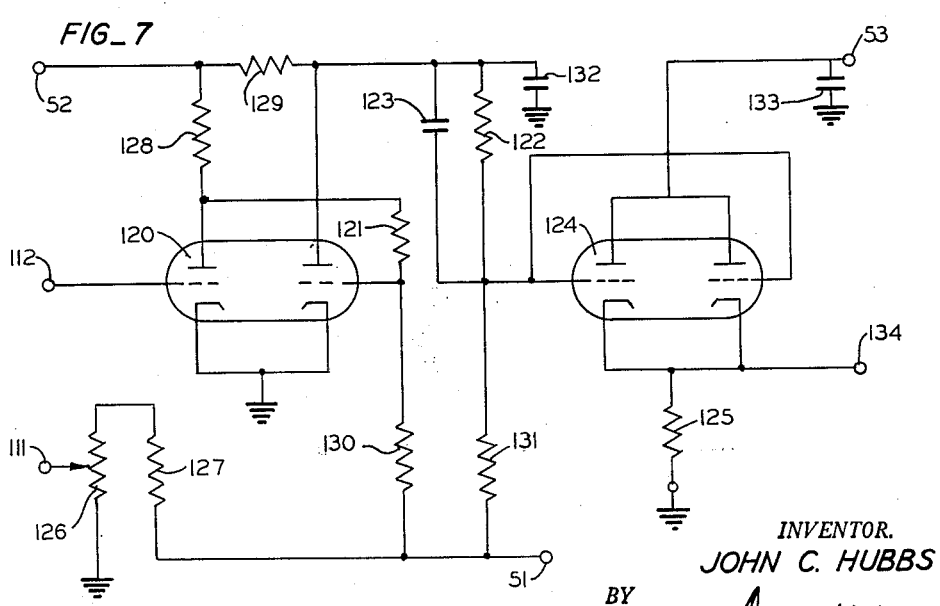
FIG_7
INVENTOR.
JOHN C. HUBBS
BY
ATTORNEY

United States Patent Office 3,079,792
Patented Mar. 5, 1963

3,079,792
ELECTRONIC FORCE BALANCING DEVICE
John C. Hubbs, Lafayette, Calif., assignor to E.H. Research Laboratories, Inc., Oakland, Calif., a corporation of California
Filed July 24, 1959, Ser. No. 829,277
4 Claims. (Cl. 73—141)

This invention relates to electronic balancing devices.

One object of this invention is to provide an electronic balancing device having extreme sensitivity and virtually absolute linearity.

Another object of this invention is to provide an electronic balancing device in which extreme linearity is obtained in part by a combination displacement detector and servomotor.

A further object of this invention is to provide for extreme linearity by limiting the coupling of both the displacement detector and the servomotor to an air coupling.

Still another object of this invention is to provide a balancing device capable of direct reading of an unknown force with linear response to the displaced positions of the balancing device.

The foregoing and other objects of this invention will become apparent to those skilled in the art upon an understanding of the following written description of a selected embodiment of this invention when considered in the light of the accompanying drawings and the appended claims.

FIG. 1 is a block diagram illustrating a selected embodiment of this invention;

FIG. 2 is a circuit diagram of power supply means used in the selected embodiment of this invention;

FIG. 3 is a circuit diagram of a servomotor field circuit used in the selected embodiment of this invention;

FIG. 4 is a circuit diagram of a servomotor armature circuit used in the selected embodiment of this invention;

FIG. 5 is a circuit diagram of an oscillator used in the selected embodiment of this invention;

FIG. 6 is a circuit diagram of amplifier means, rectifier means, signal subtracting means, and integrating means used in the selected embodiment of this invention; and FIG. 7 is a circuit diagram of a direct current amplifier used in the selected embodiment of this invention.

The selected embodiment of this invention is illustrated in connection with weighing machines of the type commonly known as analytical balances. Analytical balances per se form no part of this invention and their structure is so well known to those skilled in the art that in the interest of simplicity, only those parts of the balance required to illustrate this invention are shown diagrammatically in FIG. 1. Such balances include a beam 1 centrally supported upon a fulcrum 2 and carrying a pair of balance pans 3a, 3b at either end of the beam 1. The center of gravity of the system is preferably as near as possible to its center of rotation. The fulcrum 2 is mounted upon a base 4 illustrated as being broken away in FIG. 1.

A combination servomotor and displacement detector comprising coils 5a, 5b, 5c and 5d is associated with the beam 1 and base 4. Coils 5a and 5b are mounted for movement in response to the movement of beam 1, as by connector means 6, and coils 5c and 5d are stationarily secured with respect to the base 4, as by connector means 7a, 7b. Coils 5a and 5b are sometimes referred to in this specification and in the claims as armature coils and coils 5c and 5d are sometimes referred to in this specification and in the claims as field coils.

Means are provided for supplying a fixed, yet adjustable, direct current to field coils 5c and 5d. As illustrated these means comprise a source of regulated direct current 8 and adjustment means 9 which are connected to the field coils 5c and 5d through a pair of choke coils 10a and 10b.

Means are also provided for supplying a source of direct current to the armature coils 5a and 5b. As illustrated these means include a direct current source 11 connected to the armature coils 5a and 5b by a circuit including choke coils 12a, 12b, an electronic valve 13, range adjustment means 14a, 14b, an indicating meter 15, a tare adjuster 16 and adjustable meter shunt 17.

The foregoing elements comprise the essential features relating to the servomotor functions of the coils 5a, 5b, 5c and 5d. A predetermined field current is supplied to the field coils 5c and 5d through the source of regulated direct current 8 adjustably determined by the adjustment means 9. Motive force is applied to the armature coils 5a and 5b from the direct current source 11 in an amount determined by the electronic valve 13, the range selectors 14a and 14b, and the tare adjustment 16. The current required by the armature coils 5a, 5b is measured upon the meter 15 in accordance with the range selected by the adjustable shunt 17, the meter 15 indicating directly the weight of the sample when the instrument is in balance.

Means are provided for automatically balancing the analytical balance in response to a load causing displacement of the balance and for controlling the armature current in response to the displacement of the balance. These means utilize the displacement detector function of the coils 5a, 5b, 5c and 5d to produce a signal proportional to the displacement of the beam 1, which signal is used for operating the electronic valve 13.

The signal is induced by an oscillator 18 which supplies an oscillating signal to the coil 5a through a circuit including coupling condenser 19, the coil 5a, coupling condenser 20, the ground of the instrument and coupling condenser 21. Similarly an oscillating signal is supplied to the coil 5b through a circuit comprising coupling condenser 19, the coil 5b, coupling condenser 22, the ground of the instrument and coupling condenser 21.

The oscillations in coils 5a induce signals in one circuit comprising coil 5c, coupling condenser 23a, a portion of potentiometer 24, the ground of the device and coupling condenser 25. Similarly the radio frequency signal appearing in coil 5b induces a signal in another circuit comprising coil 5d, coupling condenser 23b, the remaining part of the potentiometer 24, the ground of the device and coupling condenser 25.

The signals in coil 5c and in coil 5d are fed respectively to amplifiers 28a, 28b and thence to rectifiers 29a, 29b. Signals 29a and 29b are subtracted from one another at a subtractor 30 and the difference signal is then fed to an integrator 31. The integrated difference signal is next fed to a direct current amplifier 32 and the output of this amplifier 32 is used to control the electronic valve provided in the servomotor armature circuit.

It will become apparent to those skilled in the art that the displacement of the beam 1 in response to load causes the electronic valve 13 to become more effective thereby resulting in an increase in the power supplied to the armature coils 5a, 5b from the power supply 11. The varying power supplied to the armature coils by electronic valve means 13 varies the strength of the magnetic field developed by those coils. This magnetic field reacts with the magnetic field of fixed strength in the field coils and produces a resultant restoring torque on the balance beam 1 which returns the beam to its null position. This action continues until the composite "error" signal supplied to valve means 13 becomes zero. This automatically establishes the balance at a balanced condition and automatically permits direct reading of weight upon the meter 15. With this preliminary understanding of the general nature of the specific embodiment of this invention we now turn to the structural details of the various components used to construct the illustrative embodiment of this invention.

The Combination Servomotor and Displacement Detector

The coils 5a, 5b, 5c and 5d making up the combination servomotor and displacement detector (see FIG. 1) are wound in toroidal form upon a slit metal spool having a diameter of 1¼" and a height of ¼". Each of the coils comprises 230 turns of size 30 wire wound with a cross-section of $3/16$" by $3/16$". Armature coils 5a and 5b are secured one at each end of the balance beam 1 so that their displacement is a function of the displacement of balance beam 1. Field coils 5c and 5d secured to the base of the apparatus are disposed coaxially with respect to coils 5a and 5b respectively. Coils 5a and 5c are oriented in reverse polarity with respect to each other and are inductively coupled solely by an air path. Coils 5b and 5d are oriented copolar with respect to each other and are also inductively coupled solely by an air path.

Power Supply Circuits

Two power supplies are provided to furnish the power requirements for the illustrative embodiment of this invention (see FIG. 2). The direct current source 11 comprises a power transformer 27 having a 110 volt primary winding 28 and a 24 volt center tapped secondary winding 29. Full wave rectification is provided by diodes 30a, 30b, 30c and 30d. Filtering and some decoupling are supplied by a network including chokes 31a and 31b, resistors 32a and 32b, and filter condensers 33a, 33b and 33c. The power supply 11 is provided with a ground terminal 34 at zero volts, a plus 12 volt terminal 35, a plus decoupled terminal 36 and a plus 24 volt terminal 37.

A second power supply 38 comprises a power transformer 39 having a 110 volt primary winding 40 and a 325 volt center tapped secondary winding 41. Full wave rectification is furnished across the entire secondary winding by a type 6X4 rectifier 42 feeding into a filter network comprising resistors 43 and 44 and filter condensers 45a and 45b. One-half of the secondary is rectified by a type 6X4 rectifier 46 having both cathodes and both plates connected in parallel for half wave rectification. The output of this rectifier is fed to a filter network comprising resistor 47 and filter condenser 45c. A type OA2 voltage regulator 48 and a type OB2 voltage regulator 49 are provided for regulating some of the output of the power supply 38.

Transformer 39 is additionally provided with a 6.3 volt secondary winding 50 for supplying the filament requirements of all of the vacuum tubes used in the illustrative embodiment of this invention.

The power supply 38 is provided with ground terminals 34a and 34b at zero output, a minus 108 volt output terminal 51, a plus 150 volt output terminal 52, a plus 325 volt output terminal 53 and a 6.3 volt A.C. output terminal 54.

The values of the several components in the power supply circuits are set forth in the tabulation below:

| Component: | Value |
| --- | --- |
| Chokes 31a, 31b | 30 millihenrys. |
| Resistors 32a, 32b | 20 ohms, 10 watts. |
| Filter condensers 33a, 33b, 33c | 1,000 mfd./15 volts. |
| Resistor 43 | 100 ohms, 1 watt. |
| Resistor 44 | 7,500 ohms, 10 watts. |
| Filter condensers 45a, 45b, 45c | 40 mfd./450 volts. |
| Resistor 47 | 10,000 ohms, 10 watts. |

Servomotor Field Circuit

The field circuit for the servomotor function of the combination servomotor and displacement detector comprises terminal 60 (see FIGS. 1 and 3), choke 10a, a regulated source of direct current 8, adjustment means 9, choke 10b, terminal 61, field coil 5d and field coil 5c.

The regulated source of direct current 8 is supplied from the direct current source 11 and, cooperating with power supply 38, furnishes a regulated source of direct current. The field current itself is furnished from terminal 37 of power supply 11 (see FIGS. 2 and 3) feeding to a circuit including resistor 62, variable resistor 63, choke 10b, terminal 61, field windings 5d and 5c (see FIG. 1), terminal 60, choke 10a, electronic valve means 64 (see FIG. 3), the ground of the apparatus and ground terminal 34 of the power supply 11 (see FIG. 2). The electronic valve means 64 comprises two transistors, type 2N277, arranged in parallelism.

Voltage regulation is supplied by a circuit comprising the minus 108 volt terminal 51 of the power supply 38 (see FIGS. 2 and 3) a fixed resistor 65, a voltage regulator 66 comprising a type 1N1314 Zener diode, and the 24 volt terminal 37 of the power supply 11. The two power supplies 11 and 38 are connected in series and cooperate to furnish the base of transistor 64 through line 67 with a regulated supply of direct current as determined by the voltage regulator 66 as well as the voltage regulator tube 49 in power supply 38.

The values of the several components used in the field circuit are as follows:

| Component: | Value |
| --- | --- |
| Radio frequency chokes 10a and 10b | 5 millihenrys. |
| Resistance 62 | 1.5 ohms, 2 watts. |
| Resistance 63 | 3 ohms, 5 watts. |
| Resistance 65 | 15,000 ohms, 2 watts. |

Variable resistor 63 is used as adjustment means to standardize the reading of meter 15 in a manner to be described later in this specification.

Servomotor Armature Circuit

The circuit for supplying direct current to the armature of the servomotor includes terminal 70 (FIGS. 1 and 4), choke 12a, electronic valve means 13, the ground of the apparatus, ground terminal 34 of power supply 11, the plus 12 volt terminal 35 of power supply 11, range adjuster 14a, resistor 71, tare adjuster 16, indicating meter 15, resistor 72, choke 12b, terminal 73 (see FIGS. 1 and 4), armature coil 5b and armature coil 5a.

Part of the power supplied to the electronic valve 13 bypasses the armature coils and the meter through a circuit including the decoupled terminal 36 of the power supply 11, range adjuster 14b, electronic valve means 13, the ground of the apparatus, and ground terminal 34 of the power supply 11. A meter shunt 17 and a bypass condenser 76a are connected in parallelism with each other and with the circuit including resistance 71, tare adjustment 16, meter 15 and resistance 72, by means of lines 74, 75.

Condenser 76b interconnects the common ends of meter shunt 17, resistor 71 and condenser 76a to ground.

Range adjusters 14a and 14b and shunt 17 are movable contact type adjustable resistors with the three contacts mechanically ganged together. Range adjuster 14a is provided with fixed resistors 77, 78; range adjuster 14b is provided with fixed resistors 79 and 80; and adjustable meter shunt 17 is provided with fixed resistors 81, 82, 83, 84 and 85, all being connected as shown in the schematic wiring diagram.

Tare adjustment 16 consists of a potentiometer 86, fixed resistance 87 and a 1.35 volt mercury cell 88. The electronic valve means 13 consists of a 2N277 type transistor. The indicating meter 15 is a 500 microampere full scale meter having an internal resistance of 200 ohms. The values for the remaining components are set forth in the tabulation below:

| Component: | Value |
| --- | --- |
| Chokes 12a and 12b | 5 millihenrys. |
| Resistor 71 | 22 ohms. |
| Resistor 72 | 100 ohms. |
| Condenser 76a | 25 mfd./25 volts. |
| Condenser 76b | 1,000 mfd./15 volts. |

Resistor 77_____ 150 ohms, 2 watts.
Resistor 78_____ 51 ohms, 2 watts.
Resistor 79_____ 360 ohms, 1 watt.
Resistor 80_____ 75 ohms, 2 watts.
Resistor 81_____ 130 ohms.
Resistor 82_____ 33 ohms.
Resistor 83_____ 10 ohms.
Resistor 84_____ 3 ohms.
Resistor 85_____ 1 ohm.
Potentiometer 86_____ 100 ohms.
Resistor 87_____ 1,000 ohms.

The tare adjustment 16 is used to adjust the balance of the scale to correct for the weight of the container in which the sample is to be placed thereby enabling the meter 15 to record only the weight of the sample. Reading from right to left, the several ranges of the meter 15 are as follows:

Position:                           Full scale range
1_____ 7 milligrams.
2_____ 3 grams.
3_____ 1 gram.
4_____ 300 milligrams.
5_____ 100 milligrams.
6_____ 30 milligrams.

*Oscillator*

The radio frequency oscillator used to emit a displacement indicating signal is supplied by the oscillator 18 shown generally in FIG. 1 and in detail in FIG. 5. This oscillator obtains its plate supply from power supply 38 shown in FIG. 2.

The oscillator tube 90 is a 6CL6 pentode connected in a conventional oscillator circuit in which a grid coil 91 is tuned by a variable condenser 92 and a plate coil 93 is tuned by a variable condenser 94. Plate and screen voltage is supplied to the oscillator from the plus 325 volt terminal 53 of the power supply 38 through a fixed resistance 95. Resistors 96 and 97 connect the suppressor grid and cathode of the pentode to ground. The oscillator in turn is connected to the armature coils through condensers 19, 20, 21 and 22 in the manner described in earlier portions oft his specification.

The grid coil 91 and the plate coil 93 constitute the windings of a conventional 265 kc. intermediate frequency transformer as used in conventional superheterodyne radio receivers. The remaining components have the values set forth below:

Component:               Value
Condenser 19_____ .01 mf.
Condenser 20_____ .01 mf.
Condenser 21_____ 0.1 mf.
Condenser 22_____ .01 mf.
Condenser 92_____ 1,000 mmf.
Condenser 94_____ 1,000 mmf.
Resistor 95_____ 18,000 ohms, 2 watts.
Resistor 96_____ 1,100 ohms.
Resistor 97_____ 100 ohms.

In the preferred embodiment of this invention the condensers 92 and 94 are adjusted so that the oscillator emits a signal of 100 kilocycles.

*Amplifier*

The signal emitted by the oscillator 18 to armature coils 5a and 5b is induced in field coils 5c and 5d and the resulting signals are fed to amplifiers 28a and 28b shown in block notation in FIG. 1 and shown in diagrammatic detail in FIG. 6.

Terminal 70 is connected through coupling condenser 26a to one grid of a type 12AY7 tube 100. The plate of tube 100 is coupled in turn through a coupling condenser 101a to one grid of a type 12AU7 tube 102. The companion of tube 102 is connected to an output coupling condenser 102a.

Similarly the terminal 73 is connected through coupling condenser 26b to the other grid of tube 100 and the companion plate of tube 100 is connected through coupling condenser 101b to the other grid of tube 102. The other companion plate of tube 102 is fed to output coupling condenser 102b. Resistors 103a, 103b, 105a and 105b are provided in the plate circuits of tubes 100 and 102; resistors 104a and 104b are provided in the grid circuit of tube 102; resistors 106 and 107 are provided in the cathode circuits of tubes 100 and 102 and condensers 108 and 109 are provided in the cathode circuits of tubes 100 and 102. Plate voltage is supplied to both tubes 100 and 102 from the 150 volt terminal 52 of power supply 38.

The values of the several components associated with the amplifier are as follows:

Component:                                    Value
Potentiometer 24_____ohms__    10,000
Condensers 26a and 26b_____mmf__       500
Condensers 101a, 101b, 102a, 102b, 108
    and 109_____mf__         .01
Resistors 103a and 103b_____ohms__    11,000
Resistors 104a and 104b_____do____   150,000
Resistors 105a and 105b_____do____    10,000
Resistor 106_____do____       360
Resistor 107_____do____       510

*Signal Rectifying Circuit*

The outputs from amplifiers 28a and 28b are fed through output coupling condensers 102a and 102b respectively to rectifiers 29a and 29b respectively. The rectifiers 29a and 29b comprise type 1N91 diodes. Rectifiers 29a and 29b are connected in series with each other so that the direct current outputs may be subtracted by the subtracting circuit next described.

*Signal Subtracting Circuit*

A signal subtracting circuit 30 is provided to subtract the outputs of rectifiers 29a and 29b from each other. The subtracting circuit includes a resistance network 110a and 110b connecting the inputs to rectifiers 29a and 29b and a line 111 connecting the outputs of said rectifiers. The difference in voltage output appears between lines 111 and 112. Resistors 110a and 110b have a value of 33,000 ohms each.

*Integrating Circuit*

The difference signal appearing across lines 111 and 112 is integrated in integrator circuit 31 (see FIG. 6). Integrator circuit 31 consists of a parallel resistor 120 and condenser 121 interconnecting lines 111 and 112. Resistor 120 has a value of 150,000 ohms and condenser 121 has a value of .01 mf.

*Direct Current Amplifier*

The integrated signal impressed across lines 111 and 112 is supplied to a direct current amplifier 32 shown in block diagram in FIG. 1 and shown diagrammatically in FIG. 7.

Line 112 is fed to one grid of a type 12AX7 tube 120 and the associated plate is coupled to the other grid of tube 120 by resistor 121. The companion plate is fed to resistor 122 and associated condenser 123 to both grids of a type 12AU7 output tube 124. The output signal appears in a cathode follower circuit including both cathodes of the tube 124, resistor 125 and the ground of the device.

The other line 111 is connected to an adjustable bias circuit for one grid of tube 120 including a potentiometer 126 and fixed resistor 127. Resistors 128 and 129 are provided in the plate circuit for each of the plates of tube 120; and resistors 130 and 131 are provided in the grid circuits for the second grid of tube 120 and both grids of tube 124. Bypass condensers 132 and 133 are associated with the second plate of tube 120 and both plates of tube 124. Plate voltage is supplied to tube 120 from the plus 150 volt terminal 52 of power supply 38; plate voltage is supplied to tube 124 from the plus 325 volt terminal 53 of power supply 38 and grid bias is supplied to both tubes 120 and 124 from the minus 108 volt terminal 51 of power supply 38.

The several components have the values set forth below:

| Component: | | Value |
|---|---|---|
| Resistor 121 | ohms | 470,000 |
| Resistor 122 | do | 270,000 |
| Resistor 125 | do | 1,000 |
| Potentiometer 126 | do | 2,500 |
| Resistor 127 | do | 100,000 |
| Resistors 128 and 129 | do | 110,000 |
| Resistor 130 | do | 470,000 |
| Resistor 131 | do | 360,000 |
| Resistor 122 | do | 270,000 |
| Condenser 123 | mf | 0.1 |
| Condensers 132 and 133 | mf | .01 |

The output from direct current amplifier 32 is directly fed from output terminal 134 to the base of the transistor 13 (see FIGS. 7 and 4).

*Operation of Balance*

A source of 110 volt 60 cycle A.C. is supplied to power supplies 11 and 38 and the apparatus is permitted to heat up for a period of about 15 minutes. The range control is adjusted so that range adjustors 14a and 14b and adjustable shunt 17 are located at position 1 which is the rest postion. The tare control 16 is then turned to the off position and beam 1 is counterbalanced for zero reading on the meter 15. The instrument is now ready for operation.

First, it is determined what range of the scale is to be used. After this determination has been made the range control is set accordingly and a standard weight equal to the full scale at the range selected is placed upon the pan of the balance. Standardization adjuster 9 is now manipulated so that meter 15 reads full scale. Next a container for the sample to be weighed is placed upon the pan in place of the standardized weight. Tare control 16 is then manipulated so that the meter reading becomes zero. Then the sample is placed within the container and its weight may be read directly upon the dial of meter 15. Minor adjustments in the operation of the device will become apparent to those skilled in the art by a manipulation of adjustable bias resistor 126 and potentiometer 24.

*Summary*

It will now become apparent to those skilled in the art that the selected embodiment of this invention provides for the first time an extremely sensitive automatic balancing device having virtual linearity of meter reading in response to an external force regardless of the displacement at which a balance is obtained. It will also become apparent that the linearity of measurement is independent of the gain of the loop transmitting the displacement signal to the servomotor circuit. In practicing this invention, those skilled in the art will at once perceive that increased gain of the transfer loop merely increases the accuracy of measurement and does not affect linearity of the device.

Further, although the selected embodiment of this invention is illustrated in connection with an analytical balance, it should be appreciated that the balancing control system of this application has utility in varied fields wherever and whenever it is desired to accurately determine an electronic balance with respect to an external force. The foregoing detailed description therefore has been given for clearness of understanding only and no unnecessary limitations should be understood therefrom, for modifications will be obvious to those skilled in the art. The accompanying claims point out the subject matter which the applicant regards as his invention.

I claim:

1. A force balancing device including field coil means comprising a first field coil and a second field coil; armature coil means comprising a first armature coil and a second armature coil; said field coil means and said armature coil means being disposed coaxially; said armature coil means being displacable axially with respect to said field coil means by application of an externally developed force; said first field coil and said first armature coil being disposed copolar with respect to each other on a first axis and being inductively coupled with each other solely by an air path; said second field coil and said second armature coil being disposed in opposite polarity with respect to each other on a second axis oriented in parallelism with said first axis and being inductively coupled to each other solely by an air path; said first armature coil being displaceable with respect to said first field coil in one direction in response to said externally developed force and said second armature coil being displaceable with respect to said second field coil in the opposite direction in response to said externally developed force; first circuit means for supplying said field coil means with a steady direct current; second circuit means for supplying said armature coil means with a variable direct current; said first circuit means and said second circuit means cooperating to produce a variable magnetic field between said field coil means and said armature coil means, said variable magnetic field having a force opposing axial displacement of said armature coil means with respect to said field coil means as developed by said external force; electronic valve means in said second circuit for adjusting the amount of current supplied to said armature coil means by said second circuit means; measuring means in said second circuit indicating the amount of direct current supplied to said armature coil means; means for supplying an alternating current to said armature coil means and serving to induce an alternating current in said field coil means; means for sensing the alternating current induced in the said field coil means and for producing a signal indicative of the displacement of said armature coil means with respect to said field coil means as developed by said external force; and means responsive to said signal for operating said electronic valve means and serving to balance the force produced by said external force with the force produced by said variable magnetic field whereby a linear proportion of the value of the external force will be indicated directly upon said indicator means.

2. A force balancing device including field coil means comprising a first field coil and a second field coil; armature coil means comprising a first armature coil and a second armature coil; said field coil means and said armature coil means being disposed coaxially; said armature coil means being displaceable axially with respect to said field coil means by application of an externally developed force; said first field coil and said first armature coil being disposed copolar with respect to each other on a first axis and being inductively coupled with each other solely by an air path; said second field coil and said second armature coil being disposed in opposite polarity with respect to each other on a second axis oriented in parallelism with said first axis and being inductively coupled to each other solely by an air path; said first armature coil being displaceable with respect to said first field coil in one direction in response to said externally developed force and said second armature coil being displaceable with respect to said second field coil in the opposite direction in response to said externally developed force; first circuit means for supplying one of said coil means with a steady direct current; second circuit means for supplying the other of said coil means with a variable direct current; said first circuit means and said second circuit means cooperating to produce a variable magnetic field between said field coil means and said armature coil means; said variable magnetic field having a force opposing axial displacement of said armature coil means with respect to said field coil means as developed by said external force; electronic valve means for adjusting the amount of current supplied to the other of said coil means by said second circuit means; measuring means indicating the amount of direct current supplied to the said other of said coil means; means for supplying an alternating current to one of said coil means and serving to induce an alternating current in the other of said coil means; means for sensing the alternating current induced in the other of said coil means and for producing a signal indicative of the displacement of said armature coil means with respect to said field coil means as developed by said external force; and means responsive to said signal for operating said electronic valve means and serving to balance the force produced by said external force with the force produced by said variable magnetic field whereby a linear proportion of the value of the external force will be indicated directly upon said indicator means.

3. A force balancing device including field coil means comprising a first field coil and a second field coil; armature coil means comprising a first armature coil and a second armature coil; said armature coil means being displaceable axially with respect to said field coil means by application of an externally developed force; said first field coil and said first armature coil being disposed copolar with respect to each other and being inductively coupled with each other solely by an air path; said second field coil and said second armature coil being disposed in opposite polarity with respect to each other and being inductively coupled to each other solely by an air path; said first armature coil being displaceable with respect to said first field coil in one direction in response to said externally developed force and said second armature coil being displaceable with respect to said second field coil in the opposite direction in response to said externally developed force; first circuit means for supplying one of said coil means with a steady direct current; second circuit means for supplying the other of said coil means with a variable direct current; said first circuit means and said second circuit means cooperating to produce a variable magnetic field between said field coil means and said armature coil means, said variable magnetic field having a force opposing axial displacement of said armature coil means with respect to said field coil means as developed by said external force; electronic valve means for adjusting the amount of current supplied to the said other of said coil means by said second circuit means; measuring means indicating the amount of direct current supplied to the said other of said coil means; means for supplying an alternating current to one of said coil means and serving to induce an alternating current in the other of said coil means; means for sensing the alternating current induced in the other of said coil means and for producing a signal indicative of the displacement of said armature coil means with respect to said field coil means as developed by said external force; and means responsive to said signal for operating said electronic valve means and serving to balance the force produced by said external force with the force produced by said variable magnetic field whereby a linear proportion of the value of the external force will be indicated directly upon said indicator means.

4. A force balancing device including field coil means; armature coil means; said armature coil means being displaceable with respect to said field coil means by application of an externally developed force; said field coil means and said armature coil means being inductively coupled with each other solely by an air path; first circuit means for supplying one of said coil means with a steady direct current; second circuit means for supplying the other of said coil means with a variable direct current; said first circuit means and said second circuit means cooperating to produce a variable magnetic field between said field coil means and said armature coil means, said variable magnetic field having a force opposing axial displacement of said armature coil means with respect to said field coil means as developed by said external force; electronic valve means for adjusting the amount of current supplied to the said other of said coil means by said second circuit means; measuring means indicating the amount of direct current supplied to the said other of said coil means; means for supplying an alternating current to one of said coil means and serving to induce an alternating current in the other of said coil means; means for sensing the alternating current induced in the other of said coil means and for producing a signal indicative of the displacement of said armature coil means with respect to said field coil means as developed by said external force; and means responsive to said signal for operating said electronic valve means and serving to balance the force produced by said external force with the force produced by said variable magnetic field whereby a linear proportion of the value of the external force will be indicated directly upon said indicator means.

References Cited in the file of this patent

UNITED STATES PATENTS

| | | |
|---|---|---|
| 2,383,757 | Ziebolz | Aug. 28, 1945 |
| 2,631,027 | Payne | Mar. 10, 1953 |
| 2,847,625 | Popowsky | Aug. 12, 1958 |
| 2,874,951 | Gilbert | Feb. 24, 1959 |

FOREIGN PATENTS

| | | |
|---|---|---|
| 547,385 | Germany | Aug. 24, 1933 |
| 970,648 | Germany | Oct. 16, 1958 |